(12) United States Patent
Picardi et al.

(10) Patent No.: US 11,287,784 B1
(45) Date of Patent: Mar. 29, 2022

(54) VEHICLE CONFIGURATION USING A MONITORING SYSTEM

(71) Applicant: Alarm.com Incorporated, Tysons, VA (US)

(72) Inventors: Robert Nathan Picardi, Herndon, VA (US); Matthew Daniel Correnti, Reston, VA (US)

(73) Assignee: Alarm.com Incorporated, Tysons, VA (US)

( * ) Notice: Subject to any disclaimer, the term of this patent is extended or adjusted under 35 U.S.C. 154(b) by 194 days.

(21) Appl. No.: 16/247,035

(22) Filed: Jan. 14, 2019

Related U.S. Application Data

(60) Provisional application No. 62/616,826, filed on Jan. 12, 2018.

(51) Int. Cl.
*G05B 19/042* (2006.01)
*H04Q 9/02* (2006.01)
*G07C 5/00* (2006.01)
*G07C 5/08* (2006.01)

(52) U.S. Cl.
CPC ............ *G05B 19/042* (2013.01); *G07C 5/008* (2013.01); *G07C 5/08* (2013.01); *H04Q 9/02* (2013.01); *G05B 2219/2637* (2013.01); *G05B 2219/2642* (2013.01)

(58) Field of Classification Search
CPC .......... G05B 19/042; G05B 2219/2637; G05B 2219/2642; H04Q 9/02; G07C 5/008
See application file for complete search history.

(56) References Cited

U.S. PATENT DOCUMENTS

| | | | |
|---|---|---|---|
| 6,526,335 B1* | 2/2003 | Treyz | H04W 4/029 701/1 |
| 8,565,936 B2 | 11/2013 | Kato et al. | |
| 10,416,665 B2 | 9/2019 | Park et al. | |
| 2004/0135702 A1 | 7/2004 | Flick | |
| 2007/0055415 A1 | 3/2007 | Taki et al. | |
| 2014/0244834 A1* | 8/2014 | Guedalia | H04W 4/21 709/224 |
| 2014/0309864 A1* | 10/2014 | Ricci | B60N 2/0244 701/36 |
| 2015/0019714 A1* | 1/2015 | Shaashua | H04L 12/2818 709/224 |
| 2015/0280937 A1* | 10/2015 | Sadhu | H04W 4/44 709/217 |
| 2016/0055691 A1 | 2/2016 | Jeong | |

(Continued)

*Primary Examiner* — Ig T An
(74) *Attorney, Agent, or Firm* — Fish & Richardson P.C.

(57) ABSTRACT

A monitoring system is configured to monitor a property. The monitoring system includes a sensor that is located at the property and that is configured to generate sensor data that reflects an environmental condition at the property. The monitoring system includes a monitor control unit that is configured to receive the sensor data. The monitor control unit is configured to analyze the sensor data. The monitor control unit is configured to, based on analyzing the sensor data, determine that a resident of the property is likely to perform an action that includes interacting with a vehicle. The monitor control unit is configured to, based on the action, determine a configuration for the vehicle. The monitor control unit is configured to transmit, to the vehicle, an instruction to configure the vehicle according to the configuration.

18 Claims, 7 Drawing Sheets

(56) References Cited

U.S. PATENT DOCUMENTS

| | | | |
|---|---|---|---|
| 2016/0193895 A1* | 7/2016 | Aich | F24F 11/62 |
| | | | 165/202 |
| 2017/0103327 A1* | 4/2017 | Penilla | G05B 15/02 |
| 2017/0180330 A1 | 6/2017 | Su et al. | |
| 2018/0007099 A1* | 1/2018 | Ein-Gil | G06F 9/468 |
| 2018/0236957 A1 | 8/2018 | Nam | |

* cited by examiner

VEHICLE CONFIGURATION USING A MONITORING SYSTEM

CROSS-REFERENCE TO RELATED APPLICATION

This application claims the benefit of U.S. Application No. 62/616,826, filed Jan. 12, 2018, the contents of which a incorporated by reference.

TECHNICAL FIELD

This disclosure generally related to monitoring systems.

BACKGROUND

Vehicles, such as passenger cars, often have configuration settings that can be configured for a particular driver.

SUMMARY

Many residents equip their homes with security monitoring systems that include one or more sensors and controls for monitoring the resident's property. For example, the monitoring system may include cameras that capture activity within a room or at an access point (e.g., at a door), motion detectors that sense movement within an area of the property, sensors on utilities (e.g., to detect water usage), or environmental controls (e.g., thermostat settings). In some cases, the monitoring system may include controlled-access entry points that require user-authentication for passage, for example, a door equipped with a keypad requiring a user-specific code for entry.

In some implementations, the sensors or controls of a security monitoring system may detect routine activity patterns of one or more residents of the home. In some implementations, the monitoring system may associate a particular activity pattern with a "scene." For example, at 6:30 AM on a weekday morning, the monitoring system may receive data from sensors that indicate there was movement about the house, that an entry door was open and closed, that the door was secured using the security code of a particular resident, "Joe." Based on the sensor data, the monitoring system may associate that activity pattern with the scene, "Joe's morning jog."

In some implementations, the monitoring system may also communicate with a device integrated into a vehicle used by a resident of the property. For example, the system may communicate with a device that attaches to an on-board-diagnostic (OBD) connection of the resident's vehicle. The OBD device may allow the monitoring system to sense and control configuration settings of the vehicle. For example, the device may allow the monitoring system to set the seat and steering wheel positions of the vehicle, adjust the vehicle's climate control settings, or start the vehicle's ignition or engine.

In some implementations, based on the sensed activity pattern of the resident, the identified scene, and/or additional information, the monitoring system may configure settings of the resident's vehicle. For example, the monitoring system may store information that indicates the particular resident, Joe, typically leaves for work in his vehicle 30 minutes after returning home from his morning jog. Based on the detecting an activity pattern associated with the scene "Joe's morning jog," the monitoring system may configure Joe's vehicle. For example, the monitoring system may store Joe's preferred settings for his vehicle and, 30 minutes after he returns home from his morning job, the monitoring system may command the device on his vehicle to adjust the configuration settings (e.g., seat position, climate, radio settings) according to his preferences.

In some examples, rather than automatically configuring the vehicle, the monitoring system may send a notification to the resident's mobile device requesting permission to configure the vehicle. For example, in the above scenario, 30 minutes after Joe returns from his morning jog, the monitoring system may send a notification to Joe's mobile phone asking if it should configure his vehicle for his departure. If Joe provides an affirmative response, the monitoring system may then configure the vehicle according to the stored configuration preferences for Joe.

In some implementations, the monitoring system may reactively configure the vehicle, that is, it may adjust the configuration settings of the vehicle in response to one or more events, or in response to a command from the resident. In some implementations, the monitoring system may pro-actively configure the vehicle, that is, it may suggest to the resident particular actions related to the vehicle that the monitoring system could perform. For example, the monitoring system may receive a weather report that indicates the outside temperatures are below freezing. The monitoring system may send a notification to the resident's mobile device 15 minutes prior to his scheduled departure to request that a defrost cycle of the vehicle be started. If the resident provides an affirmative response, the monitoring system may then start the defrost cycle of the resident's vehicle by sending a command to the device connected to the vehicle.

The techniques described in this disclosure provide one or more of the following advantages. Based on detected events, activity patterns, or scenes, a monitoring system can configure a vehicle based on a resident's preferences before he enters the vehicle. By preconfiguring the vehicle, the vehicle can be made more comfortable for the resident when he enters the car (e.g., seats already in the preferred position, interior of the car warmed or cooled according to preference). In some cases, the monitoring system may provide a notification to a mobile device of the resident, allowing the resident to determine whether a given vehicle configuration will be applied. The monitoring system may apply different vehicle configuration settings for different residents, allowing a vehicle to be customized for a particular resident.

By receiving additional information, such as traffic or weather report, the monitoring system can proactively suggest actions related to the vehicle. For example, the monitoring system may receive a report that indicates there is a traffic delay along a resident's typical route to work. The monitoring system may then send a notification to the resident's mobile device suggesting that the resident leave for work at a time earlier than normal and asking permission to start the car at that earlier time. By advising the resident of traffic delays and preparing his vehicle for an earlier departure, the monitoring system may prevent a late arrival to the resident's destination. As another example, the resident may be away from home and the monitoring system may receive a weather forecast that predicts inclement weather later in the day. The monitoring system may send a notification to the resident's mobile device suggesting that the resident return home before the inclement weather arrives and asking permission to prepare the car for resident's drive home.

According to an innovative aspect of the subject matter described in this specification a system for configuring a vehicle includes a sensor that is located at the property and that is configured to generate sensor data that reflects an environmental condition at the property; and a monitor control unit that is configured to receive the sensor data; analyze the sensor data; based on analyzing the sensor data, determine that a resident of the property is likely to perform an action that includes interacting with a vehicle; based on the action, determine a configuration for the vehicle; and transmit, to the vehicle, an instruction to configure the vehicle according to the configuration.

This implementation and other implementations may include one or more of the following optional features. The monitor control unit is configured to, based on analyzing the sensor data, determine an identity of the resident from among multiple residents of the property; and determine the configuration for the vehicle based on the identity of the resident. The monitor control unit is configured to determine a time that the resident of the property is likely to perform the action that includes interacting with the vehicle; determine a period of time for the vehicle to execute the instruction to configure the vehicle according to the configuration; and transmit, to the vehicle, the instruction to configure the vehicle according to the configuration at the period of time before the time. The monitor control unit is configured to determine a location of the vehicle; determine environmental conditions of the location of the vehicle; and determine the period of time for the vehicle to execute the instruction to configure the vehicle according to the configuration based on the environmental conditions of the location of the vehicle.

The monitor control unit is configured to determine a configuration for the vehicle by determining a seat position for the vehicle, determining a steering wheel position for the vehicle, determining a thermostat setting for the vehicle, and determining a radio setting for the vehicle. The monitor control unit is configured to provide, for output to a computing device of the resident, a prompt to transmit, to the vehicle, the instruction to configure the vehicle according to the configuration; receive, from the computing device of the resident, a request to transmit, to the vehicle, the instruction to configure the vehicle according to the configuration; and transmit, to the vehicle, the instruction to configure the vehicle according to the configuration in response to receiving the request to transmit, to the vehicle, the instruction to configure the vehicle according to the configuration. The monitor control unit is configured to determine that the resident of the property is likely to perform the action that includes interacting with the vehicle by determining that the resident is likely to perform a type of action that includes interacting with the vehicle; and determine a configuration for the vehicle by determining, from among multiple configurations, the configuration that corresponds to the type of action that the resident is likely to perform.

The sensor is a camera, a motion detector, a door/window sensor, an appliance sensor, a water usage sensor, or an energy usage sensor. The monitor control unit is configured to determine a location of the vehicle; determine environmental conditions of the location of the vehicle; and determine a configuration for the vehicle based on the environmental conditions of the location of the vehicle. The monitor control unit is configured to determine a current time; and determine a configuration for the vehicle based on the current time. The monitor control unit is configured to determine an arming status of the monitoring system; and determine that the resident of the property is likely to perform the action that includes interacting with a vehicle based on the arming status of the monitoring system. The monitor control unit is configured to determine an arming status of the monitoring system; and determine the configuration for the vehicle based on the arming status of the monitoring system.

Other implementations include corresponding systems, apparatus, computer-readable storage media, and computer programs configured to implement the actions of the above-noted methods.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
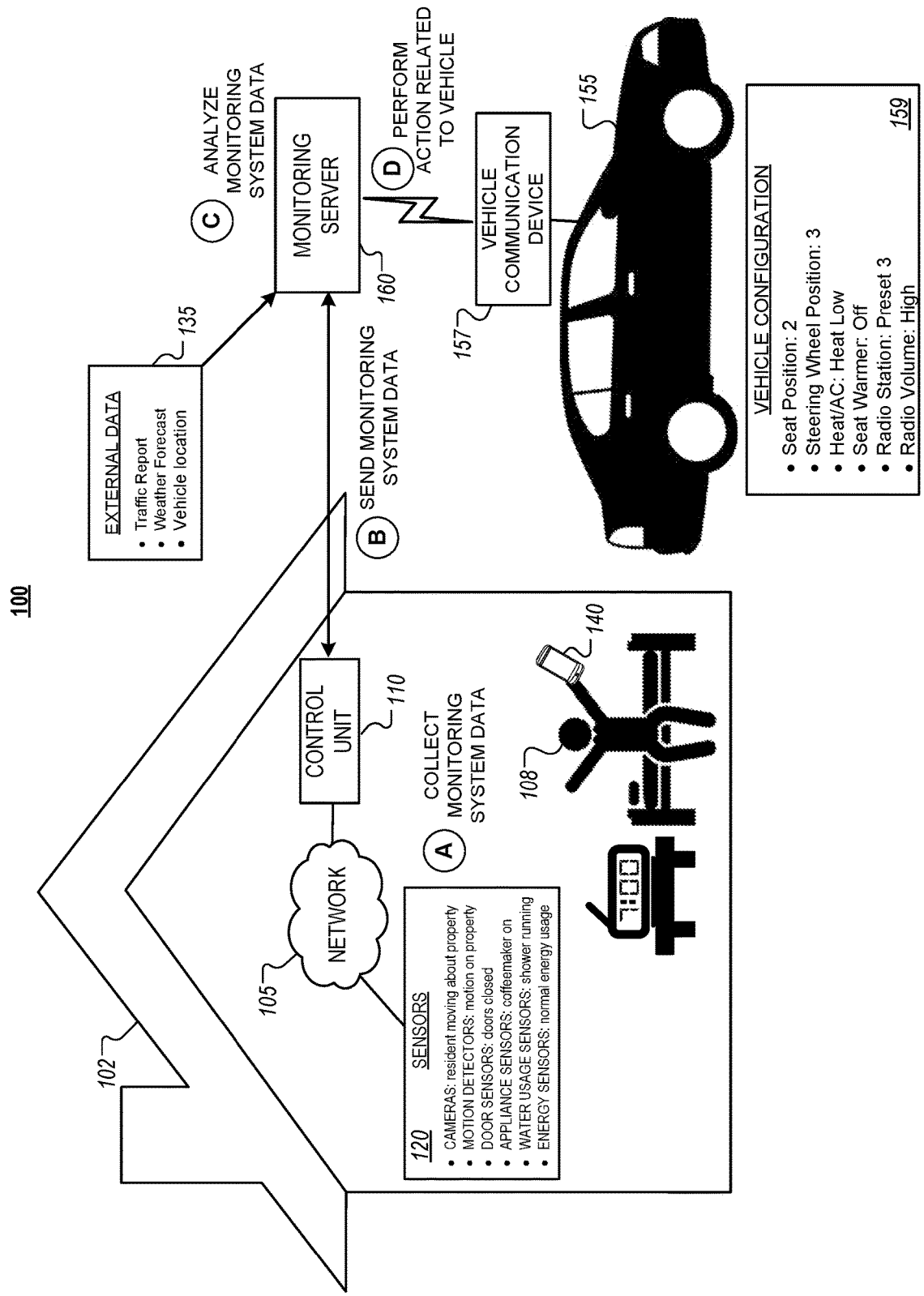
FIG. 1 is a diagram illustrating an example system for vehicle configuration using a security monitoring system.

FIG. 1 is a diagram illustrating an example system for vehicle configuration using a security monitoring system 100. In FIG. 1, a property is equipped with a security monitoring system that includes various sensors and controls, including, for example, cameras, motion detectors, and keypad access door locks. The monitoring system also communicates with a device connected to a vehicle used by a resident of the property. Based on the sensed activity pattern in the property, the identified scene, and/or additional information, the monitoring system may perform an action related to the resident's vehicle. For example, based on the activity pattern of the resident detected by the sensors, the monitoring system may determine that the resident is exiting the property. As a result, the monitoring system may communicate with the device connected to the resident's vehicle to configure the vehicle (e.g., turn on the ignition, adjust the seat, adjust the climate control) in advance of the resident's departure. FIG. 1 includes stages (A) through (D), which represent a flow of data.

The monitoring system 100 monitors a property 102. The property 102 may be, for example, a residence, such as a single family home, a town house, a condominium, or an apartment. In some examples, the property 102 may be a commercial property, a place of business, or a public property.

Present at the property 102 is a resident 108. The resident 108 may be an owner or a tenant of the property 102. The resident 108 may be a regular visitor to the property 102. In some examples, there may be more than one resident 108 present at a property 102.

The monitoring system 100 includes one or more sensors 120 located in or on the property 102. The sensors 120 may include, for example, cameras that capture video or still images of an area of the property or motion detectors that sense movement in a region of the property. The sensors 120 may also include sensors on an appliance that indicate usage of an appliance, for example, a sensor that indicates a coffeemaker or a stove is on. The sensors 120 may include utility sensors that detect resource usage, for example, an energy sensor that detects usage of electric power or a sensor that detects water usage. The sensors 120 may include microphones or other audio devices that detect audible sounds within the property 102. The sensors 120 may include temperature sensors, humidity sensors, air flow sensors, air quality detectors, or other sensors that monitor the climate or environment of an area of the property 102.

In some implementations, the sensors 120 may be related to controls of the property 102. For example, a sensor 120 may be integrated with the thermostat for the heating, ventilation, and air-conditioning (HVAC) system of the property 102. The sensor 120 may report the current HVAC temperature setting, or the current temperature measured by the HVAC system.

In some examples, the sensors 120 may be related to access points to the property 102. For example, a sensor 120 may detect whether a door or window is open or unlocked. A sensor 120 may report which resident's code or FOB device was used to unlock a door. In some examples, the sensors 120 may be related to the security system 100, itself. For example, a sensor 120 may report the status of the security system (e.g., armed, disarmed, etc.) and which resident's code was used to set the security system status.

In some implementations, the sensors 120 may detect and collect sensor data related to the activity of the resident 108. For example, the sensors 120 may capture motion sensor data detecting movement about the property 102 or cameras 120 may record video showing an individual moving throughout the home. The appliance sensors 120 may collect data indicating that a coffeemaker has been turned on, while water usage sensors 120 may indicate that a shower of the property 102 is being used. A sensor 120 integrated with the HVAC system may indicate that a temperature setting of a thermostat has changed. A motion sensor 120 may indicate that the resident 108 is in a particular room of the property 102. A door sensor 120 may indicate that an entry to the property 102 was opened or closed. A keypad sensor 120 may indicate that a particular resident's security code was used to lock or unlock a door, or change the status (e.g., arm, disarm) of the security monitoring system 100.

The monitoring system 100 also includes a control unit 110. The control unit 110 may be, for example, a computer system or other electronic device configured to communicate with the sensors 120 and perform various functions for the monitoring system 100. The control unit 110 may include a processor, a chipset, a memory system, or other computing hardware. In some cases, the control unit 110 may include application-specific hardware, such as a field-programmable gate array (FPGA), an application-specific integrated circuit (ASIC), or other embedded dedicated hardware. The control unit 110 may include software, which configures the unit to perform the functions described in this disclosure.

The sensors 120 communicate with the control unit 110, possibly through a network 105. The network 105 may be any communication infrastructure that supports the electronic exchange of data between the control unit 110 and the one or more sensors 120. The network 105 may include a local area network (LAN), a wide area network (WAN), the Internet, or other network topology. The network 105 may be any one or combination of wireless or wired networks and may include any one or more of Ethernet, cellular telephony, Bluetooth, and Wi-Fi technologies. Communications through the network 105 may be implemented through any one or combination of various protocols, including the 802.11 family of protocols, Bluetooth, Bluetooth LE, Z-Wave, ZigBee, GSM, 3G, 4G, 5G, LTE, or other custom or standard communication protocol. In some implementations, the network 105 may include optical data links. To support communications through the network 105, the sensors 120 and/or the control unit 110 may include communications modules, such as a modem, transceiver, modulator, or other hardware or software configured to enable the device to communicate electronic data through the network 105.

In some implementations, the control unit 110 may also communicate with an authorized device 140 of the resident 108, possibly through the network 105. The authorized device 140 may be, for example, a portable personal computing device, such as a cellphone, a smartphone, a tablet, a mobile device, or other electronic device. In some examples, the authorized device 140 may be an electronic home assistant or a smart speaker.

In stage (A), the sensors 120 collect monitoring system data and send the data to the control unit 110. The monitoring system data may include any raw or processed data captured, detected, or recorded by the one or more sensors 120. For example, the control unit 110 may receive from the sensors 120 images or video captured by one or more cameras, motion data collected by one or more motion detectors, data collected from appliance or energy usage sensors, or any other data collected by the sensors 120 present in the property 102. In some implementations, the control unit 110 may analyze or process some or all of the data collected by the sensors 120. The monitoring system data may also include data captured or generated by any other device associated with the monitoring system 100, including, but not limited to, control data (e.g., device settings or device statuses), appliance conditions (e.g., powered on or off, settings), monitoring system status data (e.g., armed, disarmed, home, away), date and time stamps, and historical monitoring system data (e.g., record of energy usage over specified time period).

In the example of FIG. 1, the sensors 120 collect and send to the control unit 110 monitoring system data related to the activity of the resident 108. Here, the motion sensors 120 send data detecting movement about the property 102. One or more camera sensors 120 send video images showing an individual entering and leaving a kitchen of the property 102. An appliance sensor 120 sends data indicating that a coffeemaker has been turned on and a water usage sensor 120 sends data indicating that a shower of the property 102 is being used.

In system 100, the control unit 110 communicates with a monitoring server 160, which may be remote from the property 102. In some implementations, the monitoring server 160 exchanges data electronically with the control unit 110 via a long-range data link. In some cases, the long-range data link may include any combination of wired and wireless data networks. For example, the control unit 110 may exchange information with the monitoring server 160 through a wide-area-network (WAN), a cellular telephony network, a cable connection, a digital subscriber line (DSL), a satellite connection, or other electronic means for data transmission. The control unit 110 and the monitoring server 160 may exchange information using any one or more of various communication synchronous or asynchronous protocols, including the 802.11 family of protocols, Bluetooth, Bluetooth LE, Z-Wave, ZigBee, GSM, 3G, 4G, 5G, LTE, CDMA-based data exchange or other techniques.

The monitoring server 160 may be, for instance, one or more computer systems, server systems, or other computing devices. In some implementations, the monitoring server 160 may be a cloud computing platform. The monitoring server 160 provides various monitoring services to the system 100. For example, the monitoring server 160 may monitor the property 102 for activity or alarm conditions, may provide notifications to the resident 108 of the property status, or may modify settings of the monitoring system 100.

In stage (B), the monitoring system control unit 110 located at the property 102 sends monitoring system data to the remote monitoring server 160. The control unit 110 may send any of various monitoring system data. For example, the control unit 110 may send raw or processed data collected by one or more sensors 120. The control unit 110 may send video or still images captured by cameras 120 in the property 102, motion sensing data, appliance data, data related to energy or other resource (e.g., water, natural gas) usage, system settings (e.g., a thermostat setting), audio data, or any other monitoring system data. In some examples, the control unit 110 may send to the monitoring system data related to the status of the security system 100 (e.g., armed, disarmed, etc.) or the status of one or more points of entry to the property 102 (e.g., front door is locked, side window is open, etc.).

In the example of FIG. 1, the control unit 110 sends to the monitoring server 160 monitoring system data that includes motion sensing data detecting movement on the property 102, video images indicating an individual entered and left a kitchen of the property, appliance data indicating that a coffeemaker has been turned on, and water usage data indicating that a shower of the property 102 is being used.

In some implementations, the monitoring server 160 may also receive external data 135 from a source other than the control unit 110 located in the property 102. For example, the monitoring server 160 may receive a local traffic report, weather report, or weather forecast for the property 102, possibly through an Internet connection. The monitoring server 160 may also receive the time, the date, and the day of the week on which the monitoring system data was collected or sent.

In stage (C), the monitoring server 160 analyzes the monitoring system data and/or the external data 135. In some implementations, the monitoring server 160 may identify activity patterns or routines of the one or more residents 108 based on monitoring system data received from the control unit 110 and/or the external data 135. For example, the monitoring server 160 may include an analysis engine that synthesizes, analyzes, and processes various monitoring system data and/or external data 135. The analysis engine may be configured in any combination of hardware and/or software. In some implementations, the analysis engine may include a neural network computing architecture.

Based on analyzing the data, the analysis engine of the monitoring server 160 may determine a routine activity pattern of a resident 108 of the property 102. For example, based on sensor data received from the control unit 110, the monitoring server 160 may determine that the resident 108 typically rises from bed at 6:50 AM on weekday mornings, that he then turns the coffeemaker on, takes a shower, and leaves the property 102 around 7:30 AM.

In some implementations, the analysis engine of the monitoring server 160 may associate an activity pattern with a "scene." For example, the monitoring server 160 may associate the activity pattern in which the resident 108 rises from bed, turns a coffeemaker on, and takes a shower as a "wake up" scene.

The monitoring server 160 may analyze data by any of various methods. For example, in some implementations, the analysis engine may determine an activity pattern of the resident 108 or associate an activity pattern with a scene by analyzing the monitoring system data and/or the external data against one or more rules. For example, the monitoring server 160 may store a rule that, if the "wake up" scene occurs before 7:00 AM on a weekday morning, it may be designated a "preparing for work" scene. Here, if the monitoring server 160 receives monitoring system data that detects an activity pattern of resident 108 corresponding to a "wake up" scene, as well as external data 135 that indicates it is 6:30 AM on a Tuesday morning, the monitoring server 160 may determine that the detected activity pattern is a "preparing for work" scene.

In some implementations, the monitoring server 160 may determine activity patterns or scenes by applying the monitoring system data and/or the external data 135 to a model implemented by a computer system of the monitoring server 160. For example, the model may be implemented by the analysis engine of the monitoring server 160. In some implementations, the monitoring server 160 may train, modify, or update the model using machine learning. The monitoring server 160 may store one or more models. In some examples, a model may be associated with a particular property 102 or a particular resident 108. The model may take any of various raw or processed data as input, including raw or processed sensor data, other monitoring system data, external data 135, or other data stored or received by the monitoring serer 160. For example, the monitoring server 160 may input sensor data related to the property 102 received from the control unit 110 to the model and, based on that sensor data, the model may determine that the detected sensor data corresponds to an activity pattern of the resident 108 associated with a "wake up" scene.

In some implementations, the monitoring server 160 may store or receive additional data related to routine activity patterns of one or more residents 108 of the property 102. For example, the monitoring server 160 may store data that indicates that a resident 108 typically rises from bed at 6:50 AM and typically leaves the property 102 at 7:30 AM. The monitoring server 160 may store data that describes the resident's typical route or commuting time to work each day. The monitoring server 160 may also store other information related to the routines or activity patterns of one or more residents 108 of the property 102.

In some implementations, the resident 108 may provide the monitoring server 160 information related to his routine activity patterns. For example, the resident 108 may provide information to the monitoring server 160 that indicates that he has to arrive at work by 8:00 AM on weekday mornings, that his commute takes approximately 30 minutes in normal traffic, that he typically leaves work by 5:00 PM, and that he arrives home by 5:30 PM. The resident 108 may provide the monitoring server 160 the location that he works, or details describing the typical route that he follows when driving to work.

In stage (D) of the example of FIG. 1, based on analyzing monitoring system data from the control unit 110 and/or external data 135, the monitoring server 160 performs an action related to the vehicle 155 of the resident 108. The vehicle 155 may be, for example, an automobile, such as a sedan or truck, a passenger car, a motorcycle, a bus, or other automotive the resident 108 uses for transportation. The monitoring server 160 may communicate with the vehicle 155 through a vehicle communication device 157, which is connected to the vehicle 155. In some implementations, the monitoring server 160 may communicate with the vehicle communication device 157 through a cellular telephony or data network, through a WAN, LAN, Wi-Fi, or other data communication link.

The vehicle communication device 157 may connect to the vehicle 155 through, for example, an on-board diagnostic (OBD) port of the vehicle 155. In some cases, the vehicle communication device 157 may connect to the vehicle 155 through a standard interface, such as an OBD-1, OBD1.5, or OBD-II interface. In some examples, the vehicle communication device 157 may connect to the vehicle 155 through a custom interface.

Through the connection, the vehicle communication device 157 may electronically communicate with a computer system of the vehicle 155. In some implementations, the vehicle communication device 157 may be able to perform various operations on the vehicle 155. For example, the vehicle communication device 157 may be able to start the ignition or engine of the vehicle 155, or turn on or off the vehicle's accessories. In some implementations, the vehicle communication device 157 may be able to read and/or set configuration parameters of the vehicle 155, including comfort settings (e.g., seat and steering wheel positions, seat warmer setting), safety settings (e.g., mirror position, speed warnings), climate settings (e.g., heater and air conditioner levels, fan setting, target cabin temperature), radio settings (e.g., volume, station, AM/FM band, etc.), defrost parameters or other settings of the vehicle 155. The vehicle communication device 157 may also be able to read diagnostic trouble codes (DTCs) or other settings, codes, parameters, or commands related to the vehicle 155.

In some implementations, the vehicle communication device 157 may communicate with various sensors of the vehicle 155, possibly through the computer system of the vehicle 155. For example, the vehicle communication device 157 may read the indoor cabin temperature from a temperature sensor mounted inside of the vehicle 155 or the device 157 may obtain data from or send controls to a camera sensor mounted in or on the vehicle 155.

In some implementations, the monitoring server 160 may store a preferred configuration 159 of the vehicle 155 associated with the resident 108. The preferred vehicle configuration 159 may include, for example, the seat, steering wheel, and mirror positions preferred by resident 108, preferred heating and air conditioning levels or fan settings, preferred seat warmer setting, a preferred radio station and volume, and other configurable settings of the vehicle 157 preferred by the resident 108. In some examples, the monitoring server 160 may store different preferred configurations 159 of the same vehicle 155 for different residents 108.

Based on the activity pattern of the resident 108, the scene, monitoring system data and/or the external data 135, the monitoring server 160 may perform an action related to the vehicle 155. For example, from the detected activity pattern, the monitoring server 160 may determine that the resident 108 is preparing to exit the property 102. As a result, the monitoring server 160 may send one or more commands to the vehicle communication device 157 directing it to configure the vehicle 155 according to the preferred configuration 159 of resident 108. The monitoring server 160 may send commands to perform any of various actions on the vehicle 155, including, but not limited to, starting the vehicle's ignition or engine, turning on or off the vehicle's accessories, configuring comfort settings (e.g., seat and steering wheel positions, seat warmer setting), climate settings (e.g., heater and air conditioner levels, fan setting), radio settings (e.g., volume, station, AM/FM band, etc.), defrost parameters or other settings of the vehicle 155.

In some implementations, the monitoring server 160 may determine whether to perform an action by analyzing a detected activity pattern or the scene against one or more rules related to a vehicle action, where the one or more rules describe conditions under which the server 160 may perform one or more actions related to the vehicle 155. In some examples, the one or more rules may be stored in a memory system of the monitoring server 160.

The one or more rules may be predetermined (e.g., default rules). In some implementations, the monitoring server 160 may determine the one or more rules based on analyzing activity patterns of the resident 108, for example, through analyzing, synthesizing, or processing monitoring system data by the analysis engine of the monitoring server 160. In some implementations, the resident 108 may set or customized the one or more rules. The one or more rules may be different for different activity patterns, different scenes, or different residents 108.

In some implementations, the monitoring server 160 may determine whether to perform an action by applying the monitoring system data, the external data 135, a detected activity pattern or scene to a model implemented by a computer system of the monitoring server 160. For example, the analysis engine of the monitoring server 160 may implement a model that accepts as input raw or processed monitoring system data and external data and outputs a likely vehicle action. In some examples, the monitoring server 160 may train, modify, or update the model using machine learning. The monitoring server 160 may store one or more models and in some examples, a model may be associated with a particular property 102, a particular resident 108, or a particular vehicle. The model may take any of various raw or processed data as input, including raw or processed sensor data, monitoring data, external data 135, or other data stored or received by the monitoring serer 160.

For example, in FIG. 1, the monitoring server 160 detects an activity pattern of resident 108 that indicates he began moving about the property 102, turned on the coffeemaker, and ran the shower and associates the activity pattern with the "preparing for work" scene. Based on external data 135 that indicates it is 7:00 AM on a weekday morning and a rule that indicates the server 160 should configure the vehicle 155 for the resident 108 if the resident begins the "preparing for work" scene before 8:00 AM on a weekday morning, the monitoring server 160 directs the vehicle communication device 157 to configure the vehicle 155 according to the preferred configuration 159 of the resident 108. In FIG. 1, the preferred vehicle configuration 159 of the resident 108 includes setting the seat to position "2," setting the steering wheel to position "3," turning the heat to low, turning the seat warmer off, and tuning the radio to preset station 3 with high volume.

In some examples, the monitoring server 160 may schedule, but not immediately perform, the action related to the vehicle 155. For instance, the monitoring server 160 may detect an activity pattern at 7:00 AM that indicates that the resident 108 has begun the "preparing for work" scene. The monitoring server 160 may also store or receive information that indicates that resident 108 typically departs the property 102 for work at 7:30 AM. The monitoring server 160 may then schedule the vehicle communication device 157 to configure the vehicle 155 according to the preferred configuration 159 of the resident 108 at a particular time before the resident's expected departure at 7:30 AM (e.g., 7:28 AM). In some cases, the monitoring server 160 may schedule the vehicle communication device 157 to start the ignition or engine of the vehicle 155 at a particular time before the resident's expected departure.

In some implementations, the monitoring server 160 may perform an action related to the vehicle 155 by sending a notification to an authorized device 140 of the resident 108. The monitoring server 160 may communicate with the authorized device 140 through any of a combination of one or more of various communication links. For example, the monitoring server 160 may communicate with the authorized device 140 through a cellular telephony or data network, through a WAN, LAN, Wi-Fi, or other data communication link.

In some implementations, the communication between the monitoring server 160 and the authorized device 140 may be facilitated by a software application stored in a memory system of the authorized device 140 and executed by a processor of the authorized device 140. For example, the software application may display notifications and/or messages from the monitoring server 160 on a display of the authorized device 140. The software application may also allow a user of the authorized device 140 to input commands or responses that are then sent to the monitoring server 160.

In some implementations, the monitoring server 160 may send a notification to the authorized device 140 that requests permission to configure the vehicle 155. For example, after determining that the activity pattern of the resident corresponds to a "preparing for work" scene, the monitoring server 160 may send a notification to the authorized device 140 of resident 108 requesting permission for the server 160 to start the engine of the vehicle 155. If the monitoring server 160 receives an affirmative response from the authorized device 140 (e.g., that the server 160 should start the vehicle 155), the monitoring server 160 may then direct the vehicle communication device 157 to start the engine of vehicle 155.

In some implementations, the monitoring server 160 may perform an action related to the vehicle 155 based on external data 135, in addition to any other received monitoring system data, detected activity patterns, or determined scenes. For example, the monitoring server 160 may receive external data 135 that indicates that there is a 15 minute traffic delay along the route the resident 108 usually drives to work. If the monitoring server 160 stores data that indicates the resident 108 typically leaves for work at 7:30 AM, the monitoring server may send a notification to the authorized device 140 of the resident 108 at or before 7:15 AM, alerting him to the traffic delay and asking whether the server 160 should configure the vehicle 155 for departure (e.g., start the engine, configure the vehicle 155 according to the preferences of the resident 108, etc.) 15 minutes earlier than normal.

In the example of FIG. 1, the monitoring server 160 configures the vehicle 155 according to the preferred configuration 159 based on recognizing that the activity pattern of the resident 108 corresponded to the "preparing for work" scene. The monitoring server 160 may perform different actions in response to different scenes. For example, the rules associated with the "preparing for work" scene may indicate that, in response to detecting the scene, the server 160 should adjust the comfort and climate settings of the vehicle 155 according to the resident's preferred configuration 159, but keep the radio turned off. In another scenario, the monitoring server 160 may detect an activity pattern of the resident 108 that corresponds to a "preparing for weekend drive" scene. The rules associated with the "preparing for weekend drive" scene may indicate that, in response to detecting the scene, the server 160 should adjust not only the comfort and climate settings of the vehicle 155, but should also turn the radio on and tuned to the resident's preset station, as well as turn on the vehicle's infotainment system.

In some implementations, the monitoring server 160 may distinguish between activity patterns or scenes related to different residents 108. For example, the monitoring server 160 may associate an activity pattern where a resident 108 has begun moving about the property 102, turned on a coffeemaker, and turned on a stove with "Jane's preparing for work" scene. Alternatively, the monitoring server 160 may associate an activity pattern where a resident 108 has begun moving about a property 102, exited the property 102, entered the property 102 using the entrance key code for particular resident 108, "Joe," then run a shower, with "Joe's morning jog and preparing for work" scene.

In some implementations, the monitoring server 160 may determine that an activity pattern is associated with a particular scene. For instance, the analysis engine of the monitoring server 160 may analyze, synthesize, or process current or historical (e.g., previously received) monitoring system data to detect an activity pattern or scene related to the resident 108 of the property 102. In some cases, the monitoring server 160 may determine a scene through machine learning, training algorithms, or other analytic routines.

In some implementations, the monitoring server 160 may determine that an activity pattern is associated with a particular scene based on information provided by the resident 108. For example, the resident may press a button of a device integrated into the monitoring system 100 to indicate that his current activities correspond to the "preparing for work" scene, or the resident 108 may provide information to the monitoring server 160 indicating that a coffeemaker turned on and a shower running on a weekday morning corresponds to the "preparing for work" scene. In some cases, the resident 108 may provide information related to a scene to the monitoring server 160 through a software application installed on the resident's authorized device 140.

In the system and methods disclosed herein, the monitoring server 160 may perform any of various actions related to the vehicle 155. For example, the monitoring server 160 may start or stop the ignition of the vehicle 155, turn on or off the vehicle's accessories, configure the vehicle's comfort settings (e.g., seat and steering wheel positions, seat warmer setting), climate settings (e.g., heater and air conditioner levels, fan setting), radio settings (e.g., volume, station, AM/FM band, etc.), defrost parameters or other settings of the vehicle 155. The monitoring server 160 may configure an infotainment or entertainment system of the vehicle 155. The monitoring server 160 may also adjust a display of the vehicle 155, or configure interior or exterior lights of the vehicle or audio sounds associated with vehicle actions (e.g., door chimes). The monitoring server 160 may adjust windows, door locks, trunk or hood locks, or other parameters of the vehicle 155. In some examples, the monitoring server 160 may set configurable drivability parameters of the vehicle 155, including setting a speed limiter or monitor, or other parameters.

In some implementations, in response to detecting a scene, the monitoring server 160 may perform other monitoring system actions in addition to the actions related to the vehicle 155. For example, in response to determining that the resident 108 is engaged in the "preparing to work scene," the monitoring server 160 may configure the vehicle 155 according to the resident's preferences and may also open a garage door, turn on or off certain lights, or lock or unlock certain doors.

In some implementations, the action related to the vehicle 155 may comprise the monitoring server 160 sending a notification to the authorized device 140 of the resident 108. The notification may, for example, inform the resident 108 that the vehicle 155 has been started, or that the vehicle 155 has been configured according to this preferred configuration 159. In some implementations, the monitoring server 160 may send a notification that requests permission for the monitoring server 160 to perform an action on the vehicle 155. For example, the monitoring server 160 may send a notification asking whether the server 160 should start the ignition of the vehicle 155, or if the server should turn on the defrost setting of the vehicle 155. In some cases, the monitoring server 160 may wait for an affirmative response from the resident 108 before further performing the action related to the vehicle 155.

In some implementations, the resident 108 may determine which actions the monitoring server 160 performs in response to detected conditions by setting or customizing one or more rules related to a vehicle action. For example, the resident 108 may determine that, when the monitoring server 160 detects the "preparing for work" scene, the monitoring server 160 should set the seat and steering wheel positions of the vehicle 155 into preferred positions for resident 108 but not turn on the radio of the vehicle 155. In some implementations, the resident 108 may set or customize the one or more rules by communicating with the monitoring server 160 through a software application installed on the authorized device 140 or through the control unit 110.

In some implementations, the control unit 110 may perform any one or combination of the operations attributed to the monitoring server 160 in this disclosure. For example, in some implementations, the control unit 110 may receive the external data 135 and send some or all of that external data 135, along with the monitoring system data, to the monitoring server 160. In some examples, the control unit 110 may analyze, synthesize, or process some or all of the monitoring system data and/or external data 135. In some examples, based on analyzing monitoring system data, the control unit 110 may determine an activity pattern related to the resident 108, or associate monitoring system data or an activity pattern with a particular scene. In some examples, based on the monitoring system data and/or the external data, the control unit 110 may determine the vehicle action, possibly communicating with the resident's authorized device 140 or the vehicle communication device 157 to perform the determined action.

Figure 2A:
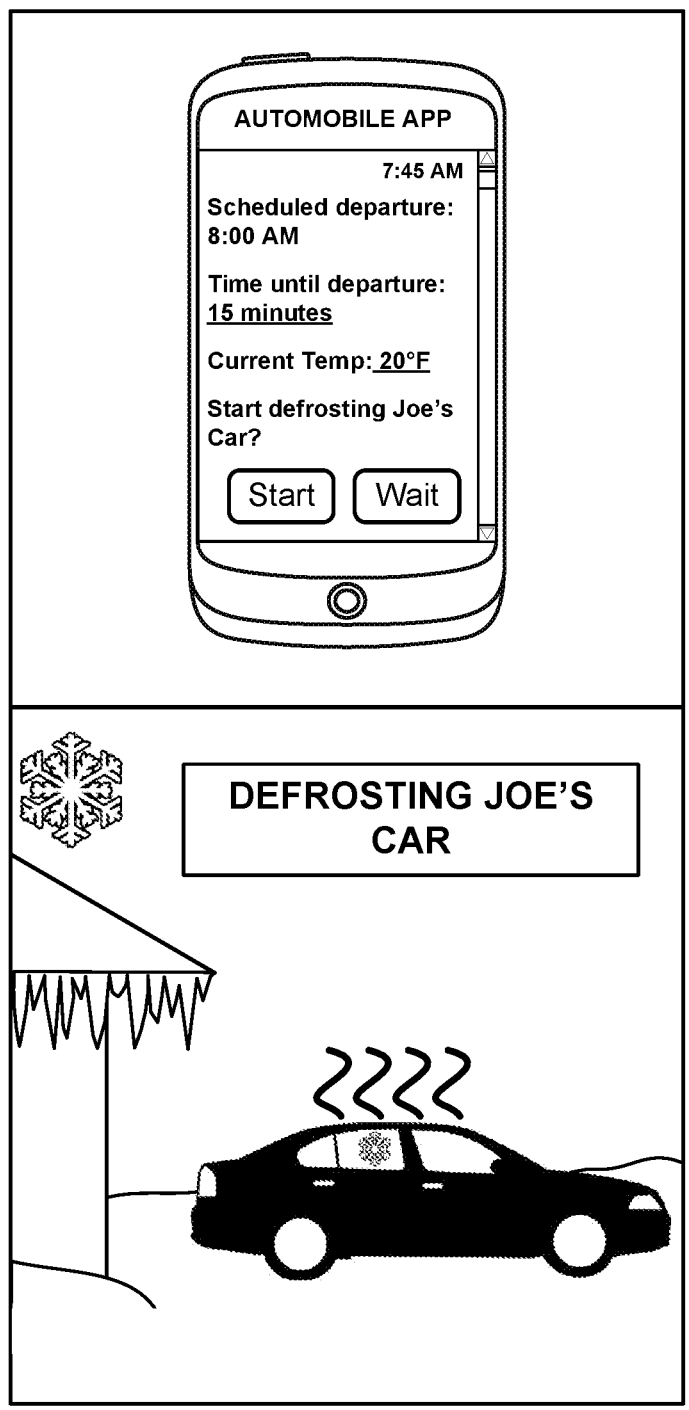
FIGS. 2A through 2C are diagrams illustrating example scenarios for vehicle configuration using a security monitoring system.
Figure 2B:
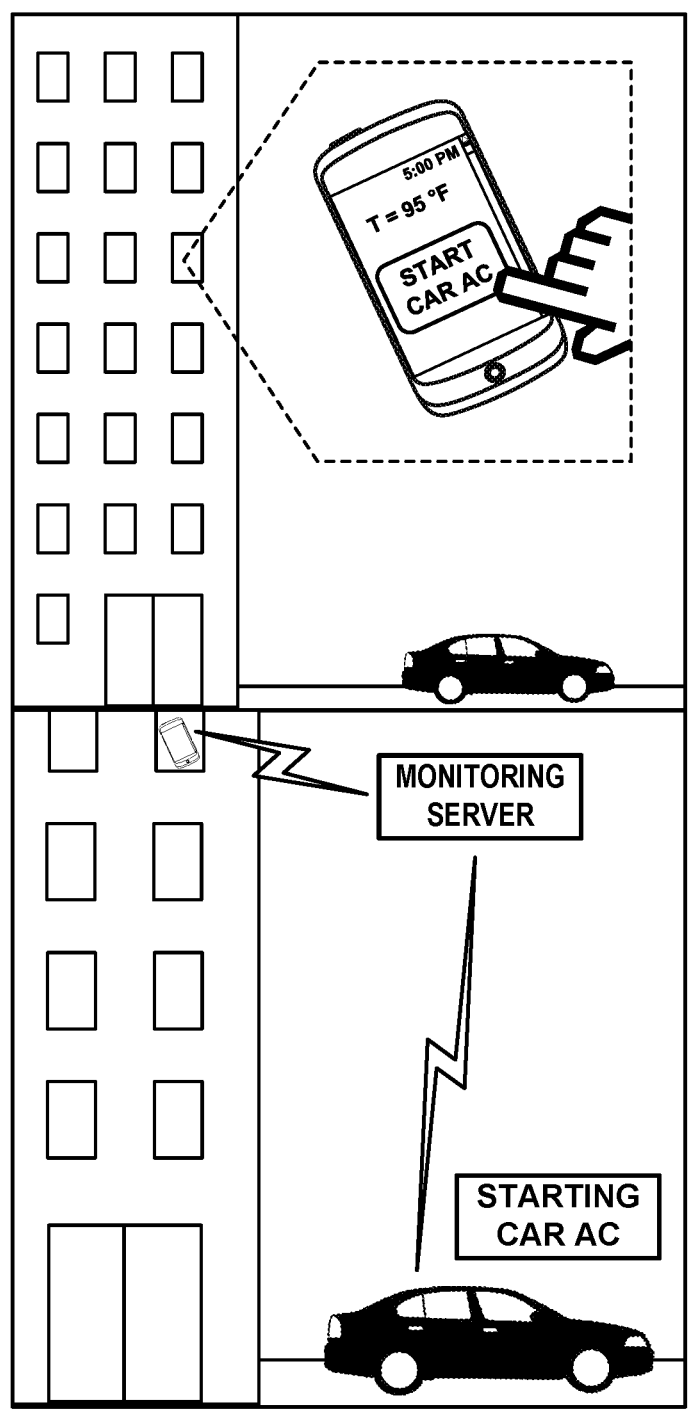
Figure 2C:
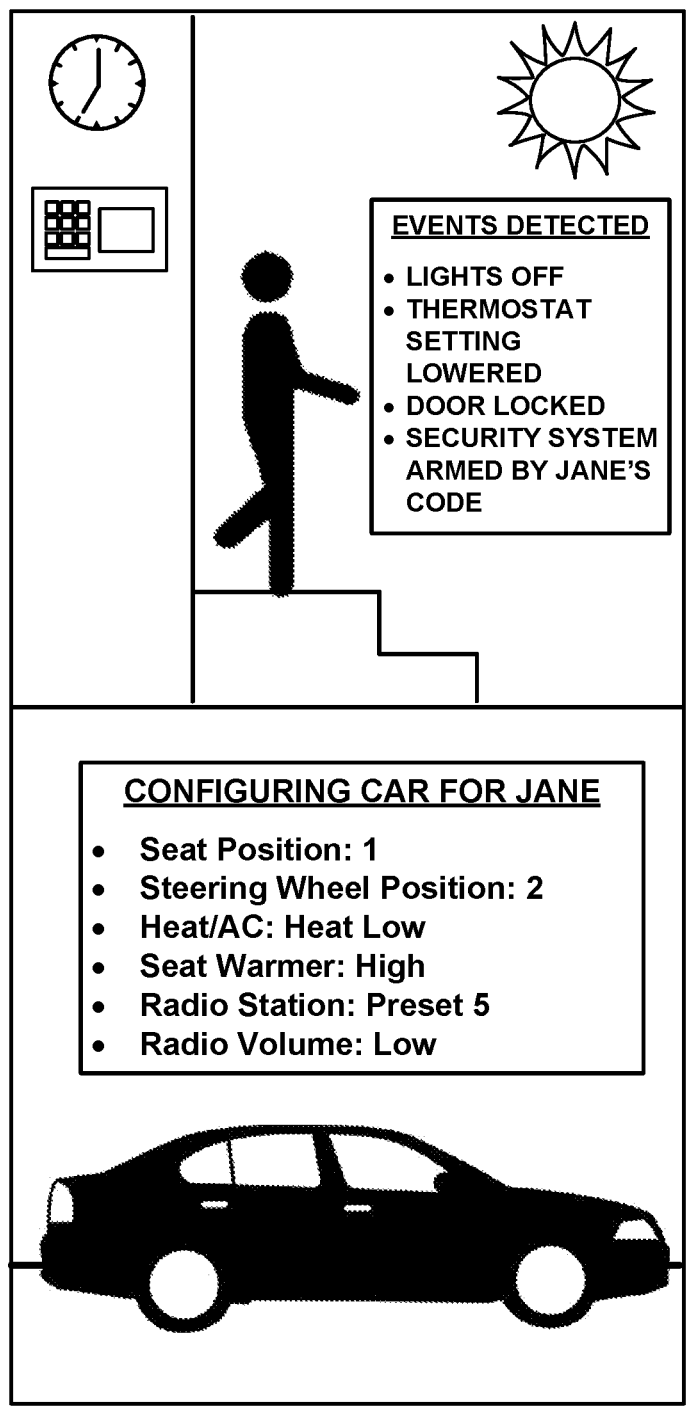

FIGS. 2A through 2C are diagrams illustrating example scenarios 200, 210, and 220, respectively, for routine vehicle configuration using a security monitoring system, such as system 100 of FIG. 1. A monitoring system 100 may perform an action related to a vehicle 155 based on one or more of various factors. For example, in FIG. 1, the monitoring server 160 configures the vehicle 155 in response to detecting an activity pattern of the resident 108 and recognizing the "preparing for work" scene. The security monitoring system 100 may also perform an action related to a vehicle 155 in response to various other factors or combination of factors. In FIGS. 2A through 2C, the monitoring server 160 performs an action related to the vehicle 155 based on a schedule and external data (200), a command from an authorized device (210), and one or more detected events (220).

In example scenario 200 of FIG. 2A, based on a schedule and external data 135 (e.g., a weather report), the monitoring server 160 sends a notification to the authorized device 140 of the resident 108 requesting permission to start a defrost cycle of a vehicle ("Joe's Car"). After receiving permission from the resident 108, the server 160 starts the defrost cycle on the vehicle 155 by sending a command to the vehicle communication device 157.

In scenario 200, the monitoring server 160 stores information indicating that resident 108 ("Joe") typically leaves the property 102 each morning at 8:00 AM. The monitoring server 160 also receives external data 135 that includes a weather report indicating that the current outdoor temperature at the property 102 is 20° F. Based on the current outdoor temperature of 20° F. and the anticipated departure time of 8:00 AM, at 7:45 AM, the monitoring server 160 sends a notification to the authorized device 140 of the resident 108 requesting permission to begin a defrost cycle on the resident's vehicle 155 ("Joe's Car"). If the monitoring server 160 receives an affirmative response from the authorized device 140, the server 160 may send a command to the vehicle communication device 157 to initiate the defrost cycle on the resident's vehicle 155 ("Joe's Car").

Alternatively, in another example, shortly before the anticipated departure of the resident 108, the monitoring server 160 may receive data from the vehicle communication device 155 indicating that the vehicle's indoor cabin temperature is 95° F. As a result, the monitoring server 160 may send a notification to the authorized device 140 of the resident 108 requesting permission to turn on an air-conditioning system of the vehicle 155. After receiving an affirmative response, the server 160 may then command the vehicle communication device 157 to start the vehicle's air-conditioning, ensuring that the vehicle interior is a comfortable temperature when the resident 108 enters the vehicle 155.

In some implementations, the monitoring server 160 may send a notification to the authorized device 140 of the resident 108 based on external data 135 that includes location information (e.g., GPS data) for the vehicle 155 or the authorized device 140. For example, the monitoring server 160 may receive location information for the vehicle 155 from the vehicle communication device 157. The monitoring server 160 may also store or receive information that the vehicle 155 is a convertible with its convertible top open. Based on the location information, the monitoring server 160 may further receive a weather forecast that indicates rain is predicted at the location of the vehicle 155 within the next hour. Based on the weather report, the monitoring server 160 may send a notification to the authorized device 140 stating the forecast rain and requesting permission to close the convertible top of the vehicle 155. If the monitoring server 160 receives an affirmative response from the authorized device 140 giving permission to close the convertible top, the server 160 will direct the vehicle communication device 157 to perform the action. In some examples, the monitoring server 160 may take the action (e.g., close the convertible top of the vehicle 155) automatically without first requesting permission. The monitoring server 160 may perform or request permission to perform various vehicle actions in response to external data 135 that includes a weather report, including adjusting the windows, doors, climate, comfort, or defrost settings of a vehicle 155.

In example scenario 210 of FIG. 2B, based on receiving a command from the authorized device 140, the monitoring server 160 performs an action related to the vehicle 155. Specifically, in scenario 210, in response to receiving a command from the authorized device 110 the monitoring server receives a command from the authorized device 140 to turn on the vehicle's air conditioning, the monitoring server 160 directs the vehicle communication device 157 to start the air conditioning of the vehicle 155.

In scenario 210, the resident 108 and the vehicle 155 are located at the resident's place of work, away from the property 102. Before leaving his place of work to return home, the resident 108 sends a command to the monitoring server 160 to turn on the air-conditioning of the vehicle 155 to ensure that the vehicle 155 is cooled to a comfortable temperature before he enters it. In some implementations, the resident 108 may send the command through a software application installed on his authorized device 140. The monitoring server 160 receives the command and directs the vehicle communication device 157 to turn on the air-conditioning of the vehicle 155. In some examples, the monitoring server 160 may send a notification to the resident's authorized device 140 confirming that the action was performed.

In some implementations, the resident 108 may send a command to perform a vehicle action to the monitoring server 160 by pressing a button of a device integrated with the monitoring system 100. The button may, for instance, be programmed to apply a particular scene, such as the "wake up" scene or the "preparing for work" scene. Based on receiving data indicating that the button was pressed, the monitoring server 160 may perform various actions related to the monitoring system, including an action related to the vehicle 155. For example, if the button press is programmed to apply the "preparing for work" scene, the monitoring server 160 may configure the vehicle 155 for the resident 108's commute to work (e.g., configure the vehicle according the resident's preferences). In some examples, the monitoring server 160 may schedule an action related to the vehicle 155 based on detecting the button press. For instance, the monitoring server 160 may schedule a command to start the ignition of the vehicle 155 to be sent 30 minutes after detecting a button press that applies the "preparing for work" scene.

The monitoring server 160 may also perform an action related to the vehicle 155 based on one or more detected events. In example scenario 220 of FIG. 2C, based on detecting a series of events indicating that a particular resident 108 ("Jane") is exiting the property 102, the monitoring server 160 configures the vehicle 155 for the particular resident 108. In scenario 220, based on monitoring system data, the monitoring server 160 detects multiple events, including: lights were turned off, the thermostat temperature setting was lowered, the door was locked, and the security system was armed using the code of the particular resident 108, Jane. Based on detecting the multiple events, the monitoring server 160 may determine that the particular resident 108, Jane, is exiting the property 102. In some implementations, the monitoring server may associate the multiple events with a "preparing to leave the property" scene. The server 160 may subsequently configure the vehicle 155 for the particular resident 108. Here, the server 160 directs the vehicle communication device 157 to configure the vehicle 155 according to Jane's preferred configuration 159.

In some implementations, the monitoring server 160 may perform different actions for different residents 108. For example, in scenario 220, the monitoring server 160 determines that the particular resident 108, Jane, is exiting the property 102 and configures the vehicle 155 according to Jane's preferred configuration, which includes placing the seat in position 1, the steering wheel in position 2, the heat on low, the seat warmer on high, the radio station set to preset station 5, and the radio volume on low. In another case, the monitoring server 160 may determine that a different resident 108, Joe, is exiting the property 102 and thus may configure the vehicle 155 according to Joe's preferred configuration, which is different than Jane's preferred configuration.

In addition to the example scenarios depicted in FIGS. 2A through 2C, based on the received monitoring system data, external data, and data from the vehicle communication device 157, the monitoring server 160 may perform a wide variety of vehicle-related actions that enhance the comfort or safety of one or more residents 108.

For example, in some implementations, the vehicle communication device 157 may be able to adjust the position or location of the vehicle 155 without a driver present (e.g., an autonomous or semi-autonomous vehicle). In this case, based on analyzing received data, the monitoring server 160 may command the vehicle communication device 157 to reposition the vehicle 155. For example, based on receiving a weather report indicating rain, at the anticipated time of the resident's departure, the monitoring server 160 may command the vehicle communication device 157 to drive the vehicle 155 closer to a door of the property 102 (or into a garage on the property 102), allowing the resident 108 to minimize or avoid contact with the rain as he enters the vehicle 155.

As another example, based on determining that the resident 108 will be departing shortly from his apartment and that the vehicle 155 is in an adjacent parking lot, the monitoring server 160 may command the vehicle communication device 157 to drive the vehicle 155 to the front of the apartment building.

In some implementations, the monitoring sever 160 may determine not to perform a vehicle-related action based on analyzing received data. For example, the monitoring server 160 may receive monitoring system data and/or vehicle data (e.g., GPS data from the vehicle communication device 157) indicating that the vehicle 155 is parked inside of a garage of the property 102 and that the garage door is closed, making it unsafe to start the engine of the vehicle 155. As a result, even if the monitoring server 160 receives a command from an authorized device 140 to start the vehicle 155, the monitoring server 160 may not perform the action to prevent the potentially dangerous accumulation of vehicle emissions inside of the closed garage. In some cases, if the monitoring server 160 determines that the engine of the vehicle 155 is running and the vehicle 155 is located inside a closed garage, the monitoring server 160 may command the vehicle communication device 157 to turn off the vehicle's engine.

In some implementations, the monitoring server 160 may receive vehicle data from the vehicle communication device 157 that it may analyze to determine whether to perform or recommend a vehicle-related action. For example, the monitoring server 160 may receive from the vehicle communication device 157 video or still images captured by a camera mounted in or on the vehicle 155. By analyzing the images, the monitoring server 160 may determine various environmental or vehicle conditions (e.g., the vehicle 155 is covered in snow or frost, or parked inside of a garage) that it may use to determine whether to recommend or perform an action (e.g., send a notification to the authorized device 140 requesting permission to turn on the vehicle's defrost).

As another example, the monitoring server 160 may receive data from the vehicle communication device 157 indicating that there is insufficient fuel in the vehicle 155 to support travel to the anticipated destination of the resident 108. The monitoring server 160 may then send a notification to the authorized device 140 of the resident 108, alerting him to the low fuel condition and suggesting that he depart fifteen minutes early to provide time for a stop at the filling station. In some implementations, the resident 108 may configure the monitoring server 160, possibly by setting one or more rules, to notify his authorized device 140 when the fuel gauge of the vehicle 155 drops to a predetermined level.

Figure 3:
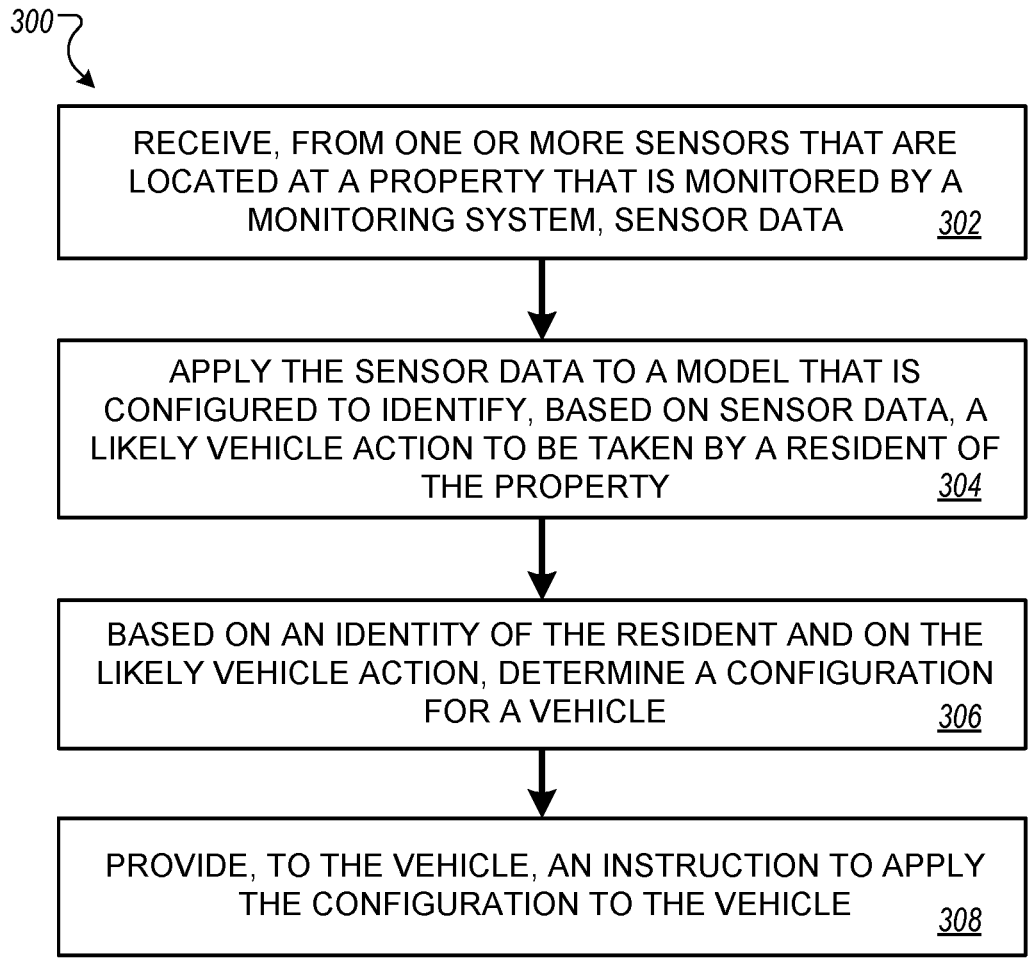
FIGS. 3 and 4 are flowcharts illustrating example processes for vehicle configuration using a security monitoring system.

FIG. 3 is a flowchart illustrating an example process 300 for vehicle configuration using a security monitoring system. Briefly, process 300 may include receiving, from one or more sensors that are located at a property that is monitored by a monitoring system, sensor data (302), applying the sensor data to a model that is configured to identify, based on the sensor data, a likely vehicle action to be taken by a resident of the property (304), based on an identity of the resident and on the likely vehicle action, determining a configuration for a vehicle (306) and providing, to the vehicle, an instruction to apply the configuration to the vehicle (308).

In more detail, the process 300 may include receiving, from one or more sensors that are located at a property that is monitored by a monitoring system, sensor data (302). The sensors may include, for example, motion detectors, cameras, noise detectors or microphones, appliance sensors, light detectors, temperature sensors, humidity sensors, resource sensors (e.g., water or electric power usage sensors), door or window sensors, or any other sensors that communicate with the monitoring system.

The security monitoring system may receive raw or processed sensor data from the sensors. In some implementations, the sensor data received by the monitoring system may include motion sensing data, video or still images, audio data, data related to appliance usage or settings, environmental data (e.g., temperature, humidity, air quality). The security monitoring system may also receive sensor data related to controls that communicate with the monitoring system, for instance, thermostat or other device settings, or related to the status of the system, itself (e.g., armed, disarmed, home, away). The security monitoring system may receive sensor data related to access at entry points to the property, including key codes used to lock or unlock a door, or security codes used to set the status of the monitoring system.

The monitoring system may apply the sensor data to a model that is configured to identify, based on the sensor data, a likely vehicle action to be taken by a resident of the property (304). The model may be, for instance, implemented in a computer system of the monitoring system and may be associated with a particular property, resident, or vehicle. In some implementations, the model may be developed, trained, updated, or modified by the monitoring system using machine learning or other autonomous learning or deep learning techniques. For example, the monitoring system may train the model based on historical sensor data received by the monitoring system.

The model may accept as input some or all of the sensor data received by the monitoring system. In some examples, the model may accept as input sensor data that has been processed by the sensors of the monitoring system. Based on the sensor data, the model may determine a likely vehicle action related to a vehicle associated with a resident of the property. For example, based on the input sensor data, the model may determine that the detected activity pattern of the resident corresponds to a "preparing for work" scene and identify that the resident is likely to enter and start the vehicle within the next hour to depart for work. In some implementations, the model may associate the identified vehicle action with a particular time at which the action is likely to occur. For example, the model may identify a likely vehicle action indicating that the resident may start the vehicle to depart for work at 7:30 AM.

In some implementations, the monitoring system may also analyze received or processed data against one or more rules to determine a likely vehicle action to be taken by the resident. For example, the monitoring system may apply raw or processed sensor data to a model that determines an activity pattern or scene related to the resident. The monitoring system may determine a likely vehicle action by analyzing the determined activity pattern or scene, as well as any other data, against one or more rules related to a vehicle action. For example, the monitoring system may determine that the activity pattern of the resident corresponds to a "preparing to leave the property" scene, while external or monitoring system data received by the monitoring system indicates that it is a Saturday morning. Based on determining that the activity pattern corresponds to a "preparing to leave the property" scene on a Saturday morning, the monitoring system may determine that the resident is likely to start the vehicle and depart on a weekend drive.

Based on an identity of the resident and on the likely vehicle action, the security monitoring system may determine a configuration for a vehicle (306). The monitoring system may determine the identity of the resident by any of various means. For example, the monitoring system may determine the identity of the resident by analyzing sensor data that includes video or still images, e.g., through facial recognition or other image processing techniques. The monitoring system may determine the identity of the resident through analyzing sensor data, such as key codes or security codes that are associated with a particular resident.

In some examples, the monitoring system may determine the identity of the resident based on the detected activity pattern or identified scene. For instance, the monitoring system may associate different "preparing for work" scenes with different residents: resident Jane's preparing for work routine may include moving about the property, turning on a coffeemaker, and turning on a stove, while resident Joe's preparing for work routine may include moving about the property, exiting and reentering the property (e.g., for a morning jog), then running a shower.

Based on the identity of the resident and the likely vehicle action, the security system may determine a configuration for the vehicle. For example, if the security system determines that the resident is "Jane" and the likely vehicle action is starting the vehicle within an hour and departing for work, the security system may determine a vehicle configuration corresponding to Jane's preferred configuration for her daily commute. As another example, if the security system determines that the resident is "Joe" and the likely vehicle action is starting the vehicle and departing on a weekend drive, the security system may determine a vehicle configuration corresponding to Joe's preferred configuration for his weekend drive.

The vehicle configuration may include settings or levels for any of the various vehicle parameters, including, but not limited to seat and steering wheel positions, seat warmer settings, climate settings (e.g., heater and air conditioner levels, thermostat settings, fan levels), radio settings (e.g., volume, station, AM/FM band, etc.), defrost parameters, infotainment or entertainment system settings, positions or locks on windows, sunroofs, or other movable components (e.g., a convertible top), the operation of lights or sounds (e.g., door chimes), speed limiters, monitors, or other settings of the vehicle.

In some implementations, the monitoring system may store one or more preferred vehicle configurations. In some examples, a preferred vehicle configuration may be associated with a particular resident, for example, a preferred configuration for Jane's commute to work and a second, possibly different, preferred configuration for Joe's commute to work. In some examples, the monitoring system may store multiple, possibly different, vehicle configurations associated with a single resident but related to different vehicle actions, for instance one preferred configuration for Joe's commute to work and a second, different preferred configuration for Joe's weekend drive.

The security monitoring system may provide, to the vehicle, an instruction to apply the configuration to the vehicle (308). In some implementations, the security monitoring system may provide the instruction to a vehicle communication device that is attached to a computer system of the vehicle. The vehicle communication device may be, for example, a device that connects to an OBD or other diagnostic port of the vehicle and which is able to sense and control settings of the vehicle. The monitoring system may communicate with the vehicle communication device wirelessly, for example, through cellular telephony or other wireless data networks. Based on the determined vehicle configuration in (306), the security monitoring system may provide one or more instructions to the vehicle communication device to configure the vehicle according to the determined configuration.

In some implementations, before providing the one or more instructions to the vehicle, the monitoring system may provide a notification to an authorized device of the resident. The authorized device may be, for example a smart phone, cell phone, tablet, or other portable computing device of the resident. In some examples, the authorized device may be a smart speaker or electronic home assistant.

In some implementations, the monitoring system may provide a notification to the authorized device indicating that the configuration has been applied to the vehicle. In some implementations, the monitoring system may provide a notification requesting permission to apply the configuration to the vehicle. In the case of a notification request, the monitoring system may wait to receive an affirmative reply from the authorized device before providing an instruction to the vehicle to apply the configuration.

Figure 4:
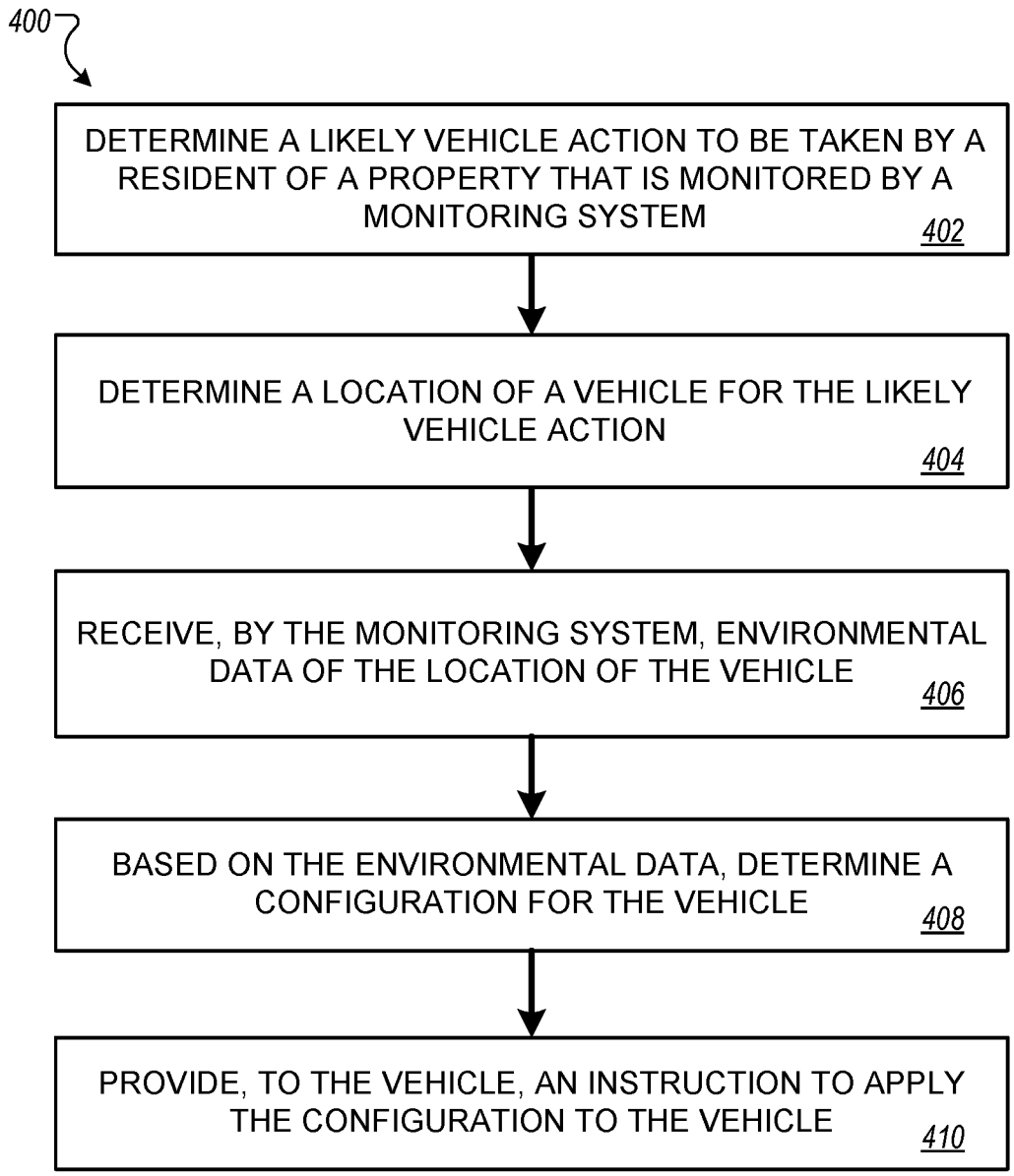

FIG. 4 is a flowchart illustrating another example process 400 for vehicle configuration using a security monitoring system. Briefly, process 400 may include determining a likely vehicle action to be taken by a resident of a property that is monitored by a monitoring system (402), determining a location of a vehicle for the likely vehicle action (404), receiving, by the monitoring system, environmental data of the location of the vehicle (406), based on the environmental data, determining a configuration for the vehicle (408) and providing, to the vehicle, an instruction to apply the configuration to the vehicle (410).

In more detail, the security monitoring system may determine a likely vehicle action to be taken by a resident of a property that is monitored by a monitoring system (402). In some implementations, the security monitoring system may determine a likely vehicle action by using a process similar to (302) and (304) of process 300, where the monitoring system receives data from one or more sensors of the system and applies the raw or processed data to a model configured to identify a likely vehicle action.

The monitoring system may determine a location of a vehicle for the likely vehicle action (404). In some implementations, the monitoring system may determine the current location of the vehicle, possibly by communicating with a vehicle communication device connected to the vehicle. In some cases, the monitoring system may determine the current location of the vehicle based on GPS information it receives from the vehicle communication device. In some implementations, the monitoring system may determine a projected location of the vehicle for the likely vehicle action, for example, a projected route of the vehicle during a resident's commute to work.

The monitoring system may receive environmental data related to the location of the vehicle (406). In some implementations, the monitoring system may receive a weather report or forecast related to the current or projected future location of the vehicle. In some implementations, the monitoring system may receive traffic information related to a projected future location or route of the vehicle.

Based on the environmental data, the monitoring system may determine a configuration for the vehicle (408). For example, based on the sensor data, the security monitoring system may determine that the detected activity pattern is associated with a resident's "preparing for work" scene and that the likely vehicle action is that the resident will start the vehicle and depart for work in 15 minutes (402). Based on GPS data received from the vehicle communication device, the monitoring system may determine that the vehicle is currently parked on a road outside of the property (404). The monitoring system may further receive a weather report indicating that it is 20° F. outside of the property (406). Based on the weather report, the monitoring system may determine that the vehicle configuration should turn on the vehicle defrost before the resident departs for work (408). In another example, the monitoring system may receive a weather report that indicates that it is 95° F. outside of the property and determine that the vehicle configuration should turn on the vehicle air-conditioning before the resident departs for work. As another example, the monitoring system may receive a weather report that forecasts rain for the current location of the vehicle and may determine that the vehicle configuration should close the windows of the vehicle.

As another example, after determining that the resident will start the vehicle and depart for work in 15 minutes, the monitoring system may determine a projected future location for the vehicle based on the resident's projected route to work (404). In some examples, the monitoring system may determine the projected future location for the vehicle based on determining the route between the current vehicle location (obtained, for example, from GPS data received from the vehicle communication device) and the resident's work location (which may, for example, be provided by the resident or learned by a computer system of the monitoring system). The monitoring system may then receive a traffic report that predicts a traffic delay along the vehicle's projected route (406). Based on the traffic report, the monitoring server may determine the vehicle should be configured according the resident's preferred configuration and that the resident's authorized device should be notified of the predicted traffic delay.

After determining the vehicle configuration, the monitoring system may then provide to the vehicle an instruction to apply the configuration to the vehicle (410). Similar to (308), the monitoring system provide the instruction to apply the configuration to the vehicle by sending one or more instructions to the vehicle communication device connected to the vehicle. In some implementations, the monitoring system may send a notification to the authorized device of the resident requesting permission to apply the configuration to the vehicle. For example, the monitoring system may send a notification to the resident's authorized device requesting permission to turn on the defrost setting or air conditioning of the vehicle. Or the monitoring system may send a notification to the resident's authorized device indicating there is a traffic delay on their projected route and requesting permission to apply the configuration to the vehicle for an early departure.

In some implementations, the monitoring system may be configured to use the arming status of the monitoring system to determine whether the resident is likely to interact with a vehicle. For example, if the arming status is armed stay, then it may be unlikely that the resident is going to interact with a vehicle in instances where the resident is located at the property. If the arming status is unarmed, then it may be likely that the resident is going to interact with a vehicle in instances where the resident is located at the property, especially if the arming status changes to armed away.

In some implementations, the monitoring system may be configured to use the arming status of the monitoring system to determine a configuration for a vehicle. For example, if the arming status is armed stay and the vehicle is located at the property, then the resident may not be leaving the property. Instead, the resident may be retrieving an item from the vehicle. In this case, the monitoring system may unlock the trunk and doors of the vehicle but not adjust the radio or thermostat. The monitoring system may also adjust the seats to make it easier to retrieve items. If the arming status changes to armed away, then it may be likely that the resident will be driving the vehicle. In this instance, the monitoring system may start the vehicle and adjust the radio, thermostat, and seats in preparation for the resident to drive the vehicle.

In some implementations, the monitoring system may include one or more safeguards to prevent potential dangerous situations. For example, if the monitoring system determines to start the car and set the thermostat to the resident's preferred setting, the monitoring system may check to ensure the car is not located in the garage with the garage door closed. In this instance, the monitoring system may override starting the vehicle with the garage door closed. The monitoring system may notify the resident that the vehicle will not be started while the garage door is closed. The monitoring system may also open the garage door and then start the vehicle instead.

Figure 5:
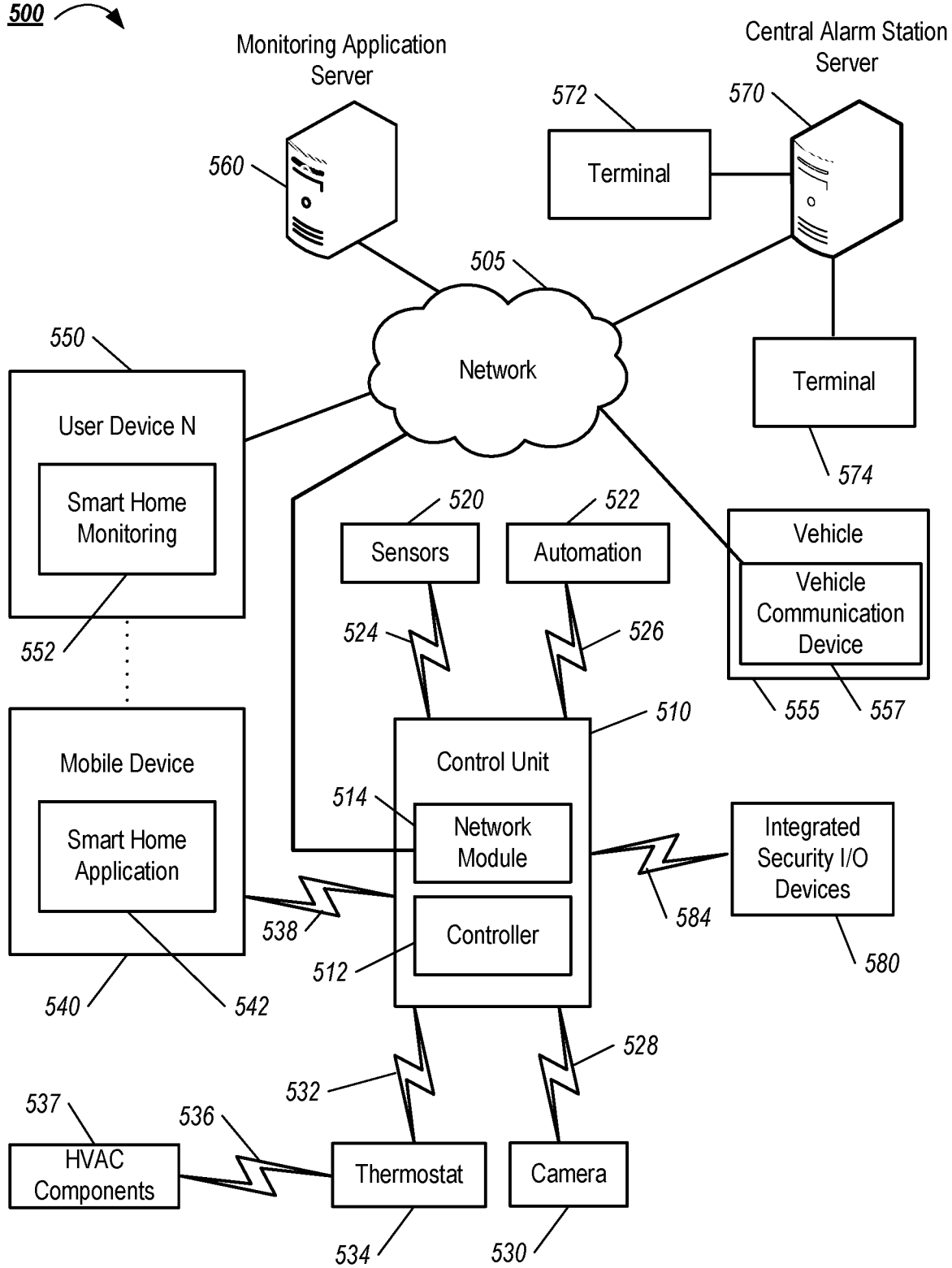
FIG. 5 is a block diagram illustrating an example security monitoring system.

FIG. 5 is a block diagram of an example security monitoring system 500. The electronic system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system.

The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The control unit 510 communicates with the module 522 and the camera 530 to perform monitoring. The module 522 is connected to one or more devices that enable home automation control. For instance, the module 522 may be connected to one or more lighting systems and may be configured to control operation of the one or more lighting systems. Also, the module 522 may be connected to one or more electronic locks at the property and may be configured to control operation of the one or more electronic locks (e.g., control Z-Wave locks using wireless communications in the Z-Wave protocol. Further, the module 522 may be connected to one or more appliances at the property and may be configured to control operation of the one or more appliances. The module 522 may include multiple modules that are each specific to the type of device being controlled in an automated manner. The module 522 may control the one or more devices based on commands received from the control unit 510. For instance, the module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or within a residential facility 102-A monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is colocated with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes a vehicle 555. The vehicle 555 may be, for example, an automobile, such as a sedan or truck, a passenger car, a motorcycle, a bus, a minivan, a scooter, or any other motorized vehicle used by a resident of the property for transportation. In some implementations, the vehicle 555 may reside on the property (e.g., in a garage or driveway of the property). In some implementations, the vehicle 555 may reside near to or adjacent to the property (e.g., parked on a road or parking lot beside the property). The vehicle 555 may be removable from the property (e.g., the resident may drive the vehicle 555 to and from the property).

Attached to the vehicle 555 may be a vehicle communication device 557. The vehicle communication device 557 may, for example, connect to the vehicle 555 through an on-board diagnostic (OBD) port of the vehicle 555. The vehicle communication device 557 may communicate with other devices of the monitoring system 500 through, for example, the network 505. In some implementations, the vehicle communication device 557 may communicate directly with the monitoring application server 560 through, for example, a cellular telephony or data network, including GSM, LTE, CDMA, 3G, 4G, 5G, or other wireless data transfer protocols and systems. In some examples, the vehicle communication device 557 may communicate with other devices of the monitoring system 500 through a WAN, LAN, Wi-Fi, Bluetooth, or other data communication link.

In some implementations, the vehicle communication device 557 may connect to and communicate with a computer system of the vehicle 555 through a standard interface, such as an OBD-1, OBD1.5, or OBD-II interface. In some examples, the vehicle communication device 557 may connect to the vehicle 555 through a custom interface.

Through the connection, the vehicle communication device 557 may electronically communicate with a computer system of the vehicle 555. In some implementations, the vehicle communication device 557 may be able to perform various operations on the vehicle 555. For example, the vehicle communication device 557 may be able to start or stop the ignition or engine of the vehicle 555. In some implementations, the vehicle communication device 557 may be able to sense and/or set configuration parameters of the vehicle 555. For example, the vehicle communication device 557 may be able to sense and/or set the vehicle's seat and steering wheel positions, seat warmer configuration, and radio settings (e.g., volume, station, AM/FM band, climate settings (e.g., heater and air conditioner levels, fan setting, defrost parameters, target cabin temperature) and sound system settings, including the radio configuration (e.g., station, AM/FM band), volume, speaker settings, audio system selection (e.g., radio, CD, other digital audio). The vehicle communication device 557 may also be able to sense and/or set connectivity settings (e.g., Wi-Fi, Bluetooth, etc.), and read and/or reset diagnostic trouble codes (DTCs) of the vehicle 555. In some implementations, the vehicle communication device 557 may be able to determine environmental parameters within the cabin of the vehicle 555, such as the cabin temperature, humidity, or air quality by, for example, communicating with a computer system of the vehicle 555 or with one or more sensors mounted in the interior cabin of the vehicle 555. In some examples, the vehicle communication device 557 may be able to receive data from or send controls to one or more cameras mounted in or on the vehicle 555.

The vehicle communication device 555 may be able to control the position of various components of the vehicle 555, including the windows, doors, door locks, hood and trunk locks, automatic doors, side or rear view mirrors, cameras, or other movable components, such as a removable roof (e.g., a convertible roof).

In some implementations, the vehicle communication device 557 may be able to accept instructions from the monitoring application server 560 or other device of the monitoring system 500. For example, the vehicle communication device 557 may be able to accept an instruction to set a parameter of the vehicle 555, or to sense and report a configuration parameter of the vehicle 555.

The vehicle communication device 557 may also be able to provide to other devices of the monitoring system 500 information and data related to the vehicle 555. For example, the vehicle communication device 557 may be able to provide information to the monitoring system 500 that indicates a current or previous setting of the vehicle, the vehicle's status, condition, or configuration.

In some implementations, the vehicle communication device 557 may be able to detect and provide the location of the vehicle 555. In some implementations, the vehicle communication device 557 may detect the location of the vehicle 555 by communicating with a computer system or sensor of the vehicle that stores location information (e.g., GPS coordinates) of the vehicle 555. In some implementations, the vehicle communication device 557 may itself contain a GPS receiver that can determine the location of the vehicle 555 to which it is attached. In some implementations, the vehicle communication device 557 may provide the location of the vehicle to a device of the monitoring system 500.

In some examples, the system 500 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 500 for use in appropriate circumstances. For instance, a robotic vacuum cleaner device may be associated with the monitoring system 500 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 510, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 510. Other types of short-range wireless communication protocols, such as Bluetooth, Bluetooth LE, Z-wave, ZigBee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 500. For instance, after completion of a monitoring operation or upon instruction by the control unit 510, the robotic devices may be configured to automatically fly to and land on one of the charging stations. In this regard, the robotic devices may automatically maintain a fully charged battery in a state in which the robotic devices are ready for use by the monitoring system 500.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices. Additionally, the one or more control units 510 may receive one or more sensor data from the sensors 520 and determine whether to provide an alert to the one or more integrated security input/output devices 580.

The sensors 520, the module 522, the camera 530, the thermostat 534, and the integrated security devices 580 communicate with the controller 512 over communication links 524, 526, 528, 532, 584, and 586. The communication links 524, 526, 528, 532, 584, and 586 may be a wired or wireless data pathway configured to transmit signals from the sensors 520, the module 522, the camera 530, the thermostat 534, and the integrated security devices 580 to the controller 512. The sensors 520, the module 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 584, and 586 may include a local network. The sensors 520, the module 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 5 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, ZigBee, HomePlug (Ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, the camera 530, and the robotic devices. The one or more user devices 540 and 550 receive data directly from the sensors 520, the module 522, the camera 530, and the robotic devices and sends data directly to the sensors 520, the module 522, the camera 530, and the robotic devices. The one or more user devices 540, 550 provide the appropriate interfaces/processing to provide visual surveillance and reporting.

In other implementations, the system 500 further includes network 505 and the sensors 520, the module 522, the camera 530, the thermostat 534, and the robotic devices are configured to communicate sensor and image data to the one or more user devices 540 and 550 over network 505 (e.g., the Internet, cellular network, etc.). In yet another implementation, the sensors 520, the module 522, the camera 530, the thermostat 534, and the robotic devices (or a component, such as a bridge/router) are intelligent enough to change the communication pathway from a direct local pathway when the one or more user devices 540 and 550 are in close physical proximity to the sensors 520, the module 522, the camera 530, the thermostat 534, and the robotic devices to a pathway over network 505 when the one or more user devices 540 and 550 are farther from the sensors 520, the module 522, the camera 530, the thermostat 534, and the robotic devices. In some examples, the system leverages GPS information from the one or more user devices 540 and 550 to determine whether the one or more user devices 540 and 550 are close enough to the sensors 520, the module 522, the camera 530, the thermostat 534, and the robotic devices to use the direct local pathway or whether the one or more user devices 540 and 550 are far enough from the sensors 520, the module 522, the camera 530, the thermostat 534, and the robotic devices that the pathway over network 505 is required. In other examples, the system leverages status communications (e.g., pinging) between the one or more user devices 540 and 550 and the sensors 520, the module 522, the camera 530, the thermostat 534, and the robotic devices to determine whether communication using the direct local pathway is possible. If communication using the direct local pathway is possible, the one or more user devices 540 and 550 communicate with the sensors 520, the module 522, the camera 530, the thermostat 534, and the robotic devices using the direct local pathway. If communication using the direct local pathway is not possible, the one or more user devices 540 and 550 communicate with the sensors 520, the module 522, the camera 530, the thermostat 534, and the robotic devices using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 530). In these implementations, the camera

530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
    a sensor that is located at the property and that is configured to generate sensor data that reflects a condition at the property; and
    a monitor control unit that is configured to:
        receive the sensor data;
        analyze the sensor data;
        based on analyzing the sensor data, identify a set of activities performed at the property;
        access stored data indicating routine activity patterns for each of a plurality of residents of the property, each routine activity pattern including one or more activities;
        compare the accessed data indicating the routine activity patterns for each of the plurality of residents of the property to the identified set of activities performed at the property;
        based on the comparison, determine that a first subset of the set of activities corresponds to a routine activity pattern of a first resident of the property;
        based on determining that the first subset of the set of activities corresponds to a routine activity pattern of the first resident of the property, determine that the first resident of the property is likely to perform an action that includes interacting with a first vehicle;
        based on the determination that the first resident is likely to perform the action that includes interacting with the first vehicle, determine a configuration for the first vehicle, the configuration being associated with the first resident;
        predict, based on a first time when the first subset of the activities was performed at the property, a second time when the first resident of the property is likely to perform the action that includes interacting with the first vehicle;
        estimate a period of time for the first vehicle to execute an instruction to configure the first vehicle according to the configuration, the period of time beginning at a time of transmitting the instruction to the first vehicle and ending at a time of completion of configuring the first vehicle according to the configuration; and
        transmit, to the first vehicle, at a time that corresponds to the estimated period of time before the second time, the instruction to configure the first vehicle according to the configuration.

2. The monitoring system of claim 1, wherein the monitor control unit is configured to:
    based on analyzing the sensor data, determine an identity of the first resident from among multiple residents of the property; and
    determine the configuration for the first vehicle based on the identity of the first resident.

3. The monitoring system of claim 1, wherein the monitor control unit is configured to:
    determine a location of the first vehicle;
    determine environmental conditions of the location of the first vehicle; and
    estimate the period of time for the first vehicle to execute the instruction to configure the first vehicle according to the configuration based on the environmental conditions of the location of the first vehicle.

4. The monitoring system of claim 1, wherein the monitor control unit is configured to determine the configuration for the first vehicle by determining a seat position for the first vehicle, the seat position being associated with the first resident.

5. The monitoring system of claim 1, wherein the monitor control unit is configured to:
    provide, for output to a computing device of the first resident, a prompt to transmit, to the first vehicle, the instruction to configure the first vehicle according to the configuration;

receive, from the computing device of the first resident, a request to transmit, to the first vehicle, the instruction to configure the first vehicle according to the configuration; and transmit, to the first vehicle, the instruction to configure the first vehicle according to the configuration in response to receiving the request to transmit, to the first vehicle, the instruction to configure the first vehicle according to the configuration.

6. The monitoring system of claim 1, wherein the monitor control unit is configured to:

determine that the first resident of the property is likely to perform the action that includes interacting with the first vehicle by determining that the first resident is likely to drive the first vehicle to a particular destination; and determine the configuration for the first vehicle by determining, from among multiple configurations, the configuration that corresponds to the particular destination to which the first resident is likely to drive the first vehicle.

7. The monitoring system of claim 1, wherein the sensor is a camera, a motion detector, a door/window sensor, an appliance sensor, a water usage sensor, or an energy usage sensor.

8. The monitoring system of claim 1, wherein the monitor control unit is configured to:

determine a location of the first vehicle;
determine environmental conditions of the location of the first vehicle; and
determine the configuration for the first vehicle based on the environmental conditions of the location of the first vehicle.

9. The monitoring system of claim 1, wherein the monitor control unit is configured to:

determine a current time; and
determine the configuration for the first vehicle based on the current time.

10. The monitoring system of claim 1, wherein the monitor control unit is configured to:

determine an arming status of the monitoring system; and
determine that the first resident of the property is likely to perform the action that includes interacting with a vehicle based on the arming status of the monitoring system.

11. A computer-implemented method, comprising:

receiving, from a sensor of a monitoring system that is configured to monitor a property, sensor data that reflects a condition at the property;
analyzing, by the monitoring system, the sensor data;
based on analyzing the sensor data, identifying a set of activities performed at the property;
accessing stored data indicating routine activity patterns for each of a plurality of residents of the property, each routine activity pattern including one or more activities;
comparing the accessed data indicating the routine activity patterns for each of the plurality of residents of the property to the identified set of activities performed at the property;
based on the comparison, determining that a first subset of the set of activities corresponds to a routine activity pattern of a first resident of the property;
based on determining that the first subset of the set of activities corresponds to a routine activity pattern of the first resident of the property, determining, by the monitoring system, that the first resident of the property is likely to perform an action that includes interacting with a first vehicle;

based on the determination that the first resident is likely to perform the action that includes interacting with the first vehicle, determining, by the monitoring system, a configuration for the first vehicle, the configuration being associated with the first resident;

predicting, based on a first time when the first subset of the activities was performed at the property, a second time when the first resident of the property is likely to perform the action that includes interacting with the first vehicle;

estimating a period of time for the first vehicle to execute an instruction to configure the first vehicle according to the configuration, the period of time beginning at a time of transmitting the instruction to the first vehicle and ending at a time of completion of configuring the first vehicle according to the configuration; and transmitting, by the monitoring system and to the first vehicle, at a time that corresponds to the estimated period of time before the second time, the instruction to configure the first vehicle according to the configuration.

12. The monitoring system of claim 1, wherein the first vehicle is a first vehicle of multiple vehicles that are associated with the property, the first vehicle being associated with the first resident of the property.

13. The monitoring system of claim 1, wherein the monitor control unit is configured to:

based on the comparison, determine that a second subset of the set of activities corresponds to a routine activity pattern of a second resident of the property;
based on determining that the second subset of the set of activities corresponds to a routine activity pattern of the second resident of the property, determine that the second resident of the property is likely to perform an action that includes interacting with a second vehicle;
based on the determination that the second resident is likely to perform the action that includes interacting with the second vehicle, determine a configuration for the second vehicle, the configuration being associated with the second resident; and
transmit, to the second vehicle, an instruction to configure the second vehicle according to the configuration.

14. The monitoring system of claim 3, wherein the configuration for the first vehicle comprises defrosting a windshield of the first vehicle;
wherein determining the environmental conditions of the location of the first vehicle comprises determining a temperature of the location of the first vehicle; and
wherein estimating the period of time for the first vehicle to execute the instruction to configure the first vehicle according to the configuration comprises:
determining, based on the temperature of the location of the first vehicle, a period of time for defrosting the windshield of the first vehicle.

15. The monitoring system of claim 1, wherein the monitor control unit is configured to determine the configuration for the first vehicle by determining a radio setting for the first vehicle, the radio setting being associated with the first resident.

16. The monitoring system of claim 1, wherein the monitor control unit is configured to determine the configuration for the first vehicle by determining a heat setting for the first vehicle, the heat setting being associated with the first resident.

17. The monitoring system of claim 1, wherein the monitor control unit is configured to:
- determine the configuration for the first vehicle by determining a preferred starting position for the first vehicle; and
- wherein transmitting, to the first vehicle, the instruction to configure the first vehicle according to the configuration causes the first vehicle to maneuver autonomously to the preferred starting position.

18. The monitoring system of claim 17, wherein the monitor control unit is configured to determine the preferred starting position for the first vehicle based on an environmental condition at a location of the first vehicle.

* * * * *